Aug. 18, 1925.
W. L. HANCOCK
COTTON CLEANER
Filed June 23, 1923
1,549,972
2 Sheets-Sheet 1
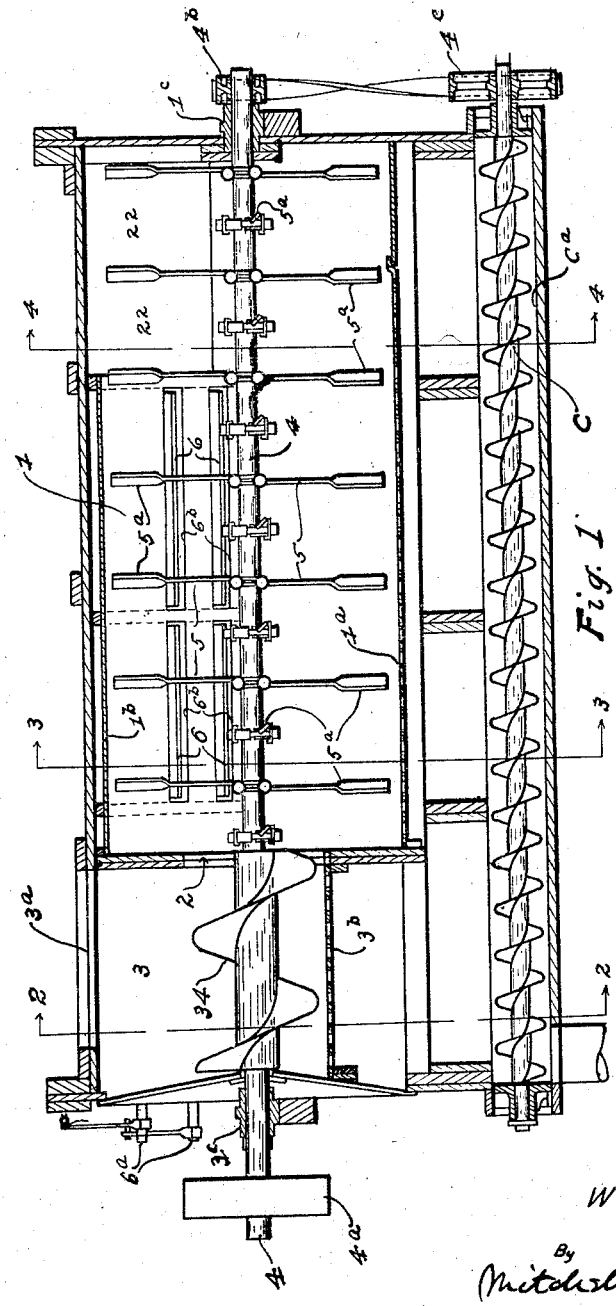
William L. Hancock
INVENTOR
By Mitchell, Chadwick & Kent,
ATTORNEYS William L. Hancock
INVENTOR By Mitchell, Chadwick & Kent,
ATTORNEYS Patented Aug. 18, 1925.

1,549,972

UNITED STATES PATENT OFFICE.

WILLIAM L. HANCOCK, OF DALLAS, TEXAS, ASSIGNOR TO THE MURRAY COMPANY, OF DALLAS TEXAS, A CORPORATION OF TEXAS.

COTTON CLEANER.

Application filed June 23, 1923. Serial No. 647,261.

*To all whom it may concern:*

Be it known that I, WILLIAM L. HANCOCK, a citizen of the United States, residing at Dallas, in the county of Dallas and State of Texas, have invented certain new and useful Improvements in Cotton Cleaners, of which the following is a specification.

My invention is an improved cotton cleaner. Cotton cleaners have long been employed in which beater arms, mounted upon a rotating shaft within a screened casing, were employed, the cotton being introduced into the casing and received by the outer ends of the beater arms and by the beater arms carried around over the screens and to the exit from the casing.

There were certain disadvantages about this method of feeding the cotton to the cleaner. The introduction of the cotton required constant oversight, in order to prevent choking the cleaner and a portion when introduced was received by the beater arms and carried forward and around more or less bodily, giving inefficient screening and cleansing action and tending to twist and roll the cotton to the detriment of the staple and sample.

In the drawings:

Figure 1 is a longitudinal vertical section of my improved cleaner;

Figure 4:
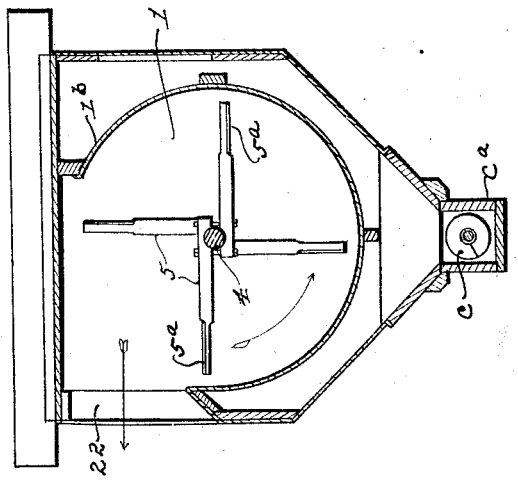
Figure 4 is a cross section on line 4—4 of Figure 1.
Figure 3:
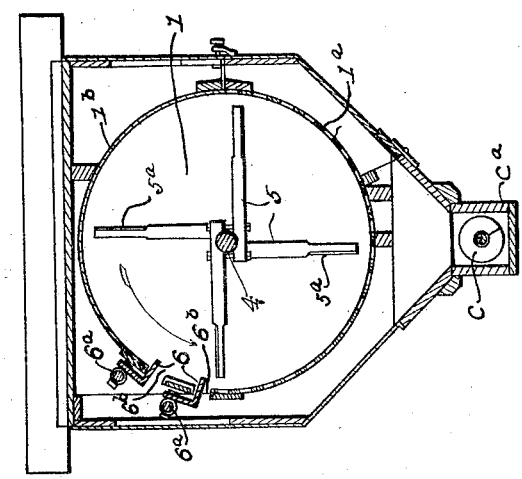
Figure 3 is a cross section on line 3—3 of Figure 1.

The main feature of my improvement lies in a novel provision for feeding cotton to the cleaner, the cotton being introduced at one end of the beater casing in and about the axis of the machine, so that it is not received by the beater arms at their beating ends and in whatever amounts the cotton may be introduced the portion or charge is broken up by the adjacent shanks of the beater arms revolving across the path of entry of the cotton and the incoming cotton is, by centrifugal force, thrown or sprayed outward to the ends of the beater arms and to the walls of the beater chamber in a relatively even sheet. Thereafter it is urged around and along the walls to the exit end of the cleaner as usual, but with this difference, that owing to the even distribution of the cotton, within the cleaner, upon the walls, the cleaning action is more thorough and there is an absence of all choking and of rolling and balling of the cotton, such as is common in cleaners into which the cotton is fed at or near the periphery.

In the preferred form of my invention, which is shown in the drawings, I provide a feeding chamber and mechanism at one end of the machine, into which the cotton is introduced from above, and which receives the cotton and advances and feeds it through the axial aperture in the end of the cleaner chamber. In the preferred form of my invention the lower half of the circle of the cleaner chamber is made up of sheet metal with multiple perforations, while the upper half of the circle is of sheet metal imperforate. In the preferred form of my invention I also provide boll breaking ribs which may at will, and without stopping the machine, be projected through the walls of the beater chamber or retracted, so as to be inoperative.

In the drawings, 1 is a beater chamber, $1^a$ a foraminous metal sheet or screen and $1^b$ an unperforated metal sheet, the two sheets covering respectively the lower and upper halves of the lining of the beater chamber. At one end the beater chamber is provided with an axial inlet opening, 2, and surrounding this opening in a casing, forming a feed chamber, 3, having at its upper side an opening $3^a$ to receive the cotton. At the other end of the beater chamber from inlet, 2, is a peripheral exit opening, 22 (see Fig. 4). Along the longitudinal axis of chambers 1 and 3 is arranged a rotatable shaft, 4, sustained, as shown in the drawings, in bearings $1^c$ and $3^c$, in the end walls of the machine, but said bearings, if desired, may be sustained by separate pedestals or hangers, suitably supported. Within the chamber 3 and secured upon the shaft 4 is a feed screw 34 and, enclosing the screw and reaching to the feed opening $3^a$ is a foraminous sheet $3^b$. At one end of shaft 4 a belt driving-pulley, $4^a$, is installed and also a pulley $4^b$ driving to a pulley $4^c$ upon the shaft of a screw conveyor C, which may be placed at the bottom of the machine, within the casing, as is common, for the purpose of receiving and evacuating the dirt and trash beaten from the cotton and dropping through the foraminous screens to the bottom of the casing and the conveyor trough, $c^a$.

Secured upon shaft 4 are a multiplicity of beater arms 5, the heads, $5^a$, of which are set at an angle as is common, calculated to give a longitudinal movement to the cotton from inlet to exit, as well as to carry the cotton around within the beater chamber, so that the cotton travels in a spiral path.

To one side of the centre, in the upper half of the beater chamber, I form a slot or slots $6^b$ and behind the slots provide a bar or bars 6 mounted upon shaft $6^a$ so that the bar can, by the rotation of the shaft $6^a$, be projected through the slot $6^b$ into the beater chamber and the path of the cotton. This bar, when projected into the path of the cotton serves as a boll breaker. The shaft $6^a$ projects at one or both ends of the machine, so that the boll breaker bar may be projected into the beater chamber or retracted at will and without stopping the machine. This is a feature of my invention.

I have shown and described the foraminous screens as sheet metal perforated, rather than, as is customary, wire mesh screens. I prefer perforated metal for the reason that after a short time in use, it acquires a glassy polish and offers the minimum of frictional resistance, thus decreasing the tendency to form rolls or twists in the cotton which is detrimental, as is obvious.

The operation is as follows: Cotton is fed into the feed chamber 3 through the feed opening $3^a$ and passes within the control of feed screw 34 by which it is actuated longitudinally to the axial feed opening, 2, and into the beater chamber. In this preliminary transit a considerable amount of cleaning is accomplished, the dust and dirt falling through the foraminous sheet $3^b$ to the bottom of the casing and the conveyor C. As the cotton enters the beater chamber it is engaged by the shanks of the beater arms 5 and scattered to the perimeter of the beater chamber, where it is engaged by the heads $5^a$ and urged around and along the walls of the chamber toward the exit, 22, being beaten free of dust and trash in the transit and thoroughly loosened and opened. The dust and trash fall through the openings in the foraminous sheet $1^a$ to the bottom of the casing and the conveyor C, and the cleaned cotton is finally ejected through the exit opening 22.

Figure 2:
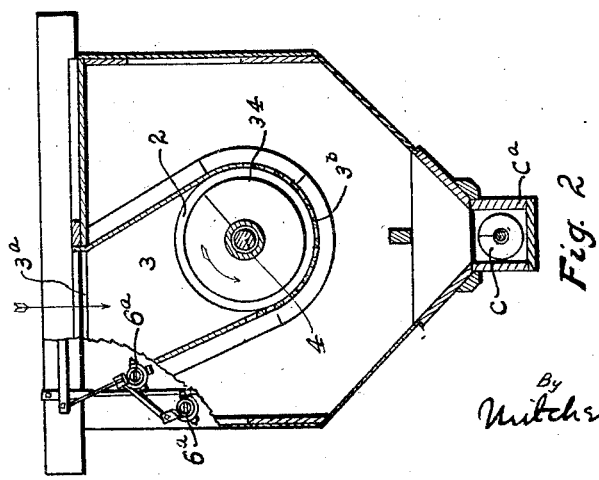
Figure 2 is a view of the inlet end, partly in full elevation and partly in sectional elevation as on line 2—2 of Figure 1.

If the cotton being operated upon is found to contain unbroken bolls, the boll breaker bars, 6, may be thrown forward through the slots $6^b$ by rotating the shafts $6^a$. These bars are preferably located in the upper half of the machine on the side where the beater heads $5^a$ are moving downward and are so adjusted as to stop leaving a small clearance between the beater heads $5^a$ and the breaker bars 6. The unbroken bolls are thrown violently against the bar and broken open. When the cotton is free of unbroken bolls the bars may be retracted by operating the shafts $6^a$ from the outer end of the machine (see Fig. 2).

I claim:

1. In a cotton cleaner, a screen-casing having a feed opening into a feed chamber at one end and an exit opening from a cleaner chamber at the other end; bearings at either end of the casing; a shaft supported in the bearings axially of the screen; beater arms on the shaft within the cleaner chamber; a feed-screw on the shaft within the feed chamber; a floor beneath and adjacent the feed screw to support the incoming seed cotton to and against the shanks of the beater arms and to cooperate with the feed screw in moving the seed cotton in bulk to and against the shanks of the beater arms, substantially as described.

2. In a cotton cleaner, a casing having inlet and exit openings and within its lower half a foraminous screen and within its upper half a plate slotted longitudinally; a rotatable shaft at the axis of the casing extending through the casing, supported in suitable bearings at its ends; beater arms secured to the shaft to rotate therewith; longitudinal boll-breaker bars, arranged outside the slotted plate and adjacent to the slot, to be advanced or retracted through the slot, to cooperate with the beater arms.

3. In a cotton cleaner, a casing having an axial inlet opening at one end of the casing and a peripheral exit opening at the other end of the casing and within its lower half a foraminous screen and within its upper half a plate slotted longitudinally; a feed chamber at one end of the casing; means within the feed chamber to force cotton through the axial opening into the casing; a rotatable shaft at the axis of the casing extending through the casing and the feed chamber, supported in suitable bearings at its ends; beater arms secured to the shaft and rotating therewith; longitudinal boll-breaking bars, arranged outside the slotted plate adjacent to the slot, to be advanced or retracted through the slot, to cooperate with the beater arms.

Signed at Dallas, Texas, this 18th day of June, 1923.

WILLIAM L. HANCOCK.